US008894434B2

(12) United States Patent
Feye-Hohmann

(10) Patent No.: US 8,894,434 B2
(45) Date of Patent: Nov. 25, 2014

(54) SOLAR PLUG CONNECTION

(75) Inventor: Juergen Feye-Hohmann, Detmold (DE)

(73) Assignee: Phoenix Contact GmbH & Co. KG (DE)

( * ) Notice: Subject to any disclaimer, the term of this patent is extended or adjusted under 35 U.S.C. 154(b) by 67 days.

(21) Appl. No.: 13/807,153

(22) PCT Filed: Jun. 27, 2011

(86) PCT No.: PCT/EP2011/003158
§ 371 (c)(1),
(2), (4) Date: Dec. 27, 2012

(87) PCT Pub. No.: WO2012/000640
PCT Pub. Date: Jan. 5, 2012

(65) Prior Publication Data
US 2013/0102191 A1 Apr. 25, 2013

(30) Foreign Application Priority Data
Jun. 29, 2010 (DE) .......................... 10 2010 025 549

(51) Int. Cl.
*H01R 4/24* (2006.01)
*H01R 4/50* (2006.01)
*H01R 13/59* (2006.01)
*H01R 24/28* (2011.01)
*H01R 101/00* (2006.01)

(52) U.S. Cl.
CPC ............ *H01R 4/2475* (2013.01); *H01R 4/5033* (2013.01); *H01R 13/59* (2013.01); *H01R 24/28* (2013.01); *H01R 2101/00* (2013.01); *Y02B 10/12* (2013.01)
USPC ............................ 439/427; 439/452; 439/584

(58) Field of Classification Search
CPC ............................... H01R 4/5033; H01R 13/59
USPC ................. 439/425, 427, 430, 452, 470, 584
See application file for complete search history.

(56) References Cited

U.S. PATENT DOCUMENTS

| 3,188,380 | A | * | 6/1965 | Lorenz ........................ 174/75 R |
| 4,145,075 | A | * | 3/1979 | Holzmann ..................... 285/81 |
| 4,781,617 | A | * | 11/1988 | Alibert .......................... 439/461 |
| 4,944,686 | A | | 7/1990 | Gertz |
| 5,899,769 | A | * | 5/1999 | Konetschny et al. .......... 439/394 |
| 6,705,884 | B1 | | 3/2004 | McCarthy |
| 7,066,750 | B2 | * | 6/2006 | Claus et al. .................... 439/194 |
| 7,121,872 | B1 | | 10/2006 | Hanks |
| 7,425,153 | B1 | | 9/2008 | Miller |
| 7,575,465 | B2 | * | 8/2009 | Hanks ........................... 439/427 |

(Continued)

OTHER PUBLICATIONS

International Search Report for PCT/EP2011/003158, English translation attached to original, Both completed by the European Patent Office on Oct. 18, 2011, All together 5 Pages.

*Primary Examiner* — James Harvey
(74) *Attorney, Agent, or Firm* — Brooks Kushman P.C.

(57) ABSTRACT

A solar plug connection for photovoltaic systems, having a contact housing and a terminal housing. The terminal housing can be connected to the contact housing and is used to receive at least one solar cable which can be freely assembled and which includes a conductor. The contact housing is equipped with a contact pin for contacting the conductor of a cable to be connected. The contact housing is equipped with a thread that interacts with a thread provided on the terminal housing in order to introduce the contact pin into the conductor of the cable from the front in a defined manner when screwing together the contact housing and the terminal housing.

12 Claims, 2 Drawing Sheets

(56) References Cited

U.S. PATENT DOCUMENTS

| | | |
|---|---|---|
| 7,931,487 B1 * | 4/2011 | Cappuccio et al. ........... 439/395 |
| 2003/0207610 A1 * | 11/2003 | Lindemann et al. .......... 439/427 |
| 2005/0260889 A1 * | 11/2005 | Claus et al. ................... 439/577 |
| 2013/0102191 A1 * | 4/2013 | Feye-Hohmann ............ 439/583 |
| 2013/0133915 A1 * | 5/2013 | Feye-Hohmann .............. 174/50 |

\* cited by examiner

SOLAR PLUG CONNECTION

CROSS-REFERENCE TO RELATED APPLICATION

This application is the U.S. national phase of PCT Appln. No. PCT/EP2011/003158 filed on Jun. 27, 2011, which claims priority to European Patent Application No. 10 2010 025 549.1 filed on Jun. 29, 2010, the disclosures of which are incorporated in their entirety by reference herein.

TECHNICAL FIELD

The invention relates to a solar plug connection for photovoltaic installations which serves in particular for photovoltaic installations which serves in particular for electrically connecting individual solar modules and which is suitable for transmitting the corresponding current intensities and voltages securely and permanently. In particular, the invention relates to plug connections for photovoltaic installations which are mounted on roofs of houses, for example, in order to make an appreciable contribution to production of electricity. The quantity of electricity produced there is regularly fed into the public grid and is thus generally available. Even relatively small installations can annually produce 10 000 kilowatt-hours or more of electricity.

BACKGROUND

The prior art has disclosed a wide variety of solar plug connections which are suitable for connecting individual solar modules. Such known solar plug connections function reliably and also permanently. In the course of increasingly widespread mounting of photovoltaic installations on roofs and the like, however, mounting is not always carried out by specialist companies that specialize in the electrical wiring, but rather by businesses oriented toward mounting such photovoltaic modules on roof surfaces. On roof surfaces, mounting is often subject to conditions made somewhat more difficult since many roofs are inclined. Special tools for a variety of different connections is often not present on site. Furthermore, in the case of photovoltaic installations it is necessary to ensure many years of reliable operation in order that the high investment costs are amortized.

The failure of an individual plug connector can result in a considerable outlay on maintenance since all of the plug connectors may have to be examined in order to discover the defective plug connection. An increased maintenance requirement can have a disadvantageous effect on the financial situation.

Therefore, it is important to be able to ensure a reliable service life that lasts for many years. Moreover, it is highly advantageous if the mounting work to be carried out can manage without a special electrical tool.

Therefore, the object of the present invention is to provide a reliable electrical plug connection of photovoltaic installations which is able to be mounted in a simple manner and in particular without a special tool and which makes possible a permanent and reliable electrical connection.

SUMMARY

This object is achieved by means of the solar plug connection comprising the features of claim 1. The dependent claims relate to preferred developments of the invention. Further advantages and features are evident from the exemplary embodiment.

A solar plug connection according to the invention is provided in particular for use on photovoltaic installations and comprises at least one contact housing and at least one connection housing, wherein the connection housing is connectable to the contact housing and serves for receiving at least one freely assemblable cable and in particular solar cable having a conductor. In this case, at least one contact needle for making contact with the conductor of a cable to be connected is arranged on the contact housing. A thread is arranged on the contact housing, said thread being provided for interacting with a thread provided on the connection housing, in order to introduce the contact needle into the conductor of the cable from the front in a defined manner when screwing together the contact housing and the connection housing.

The solar plug connection according to the invention has many advantages since it allows a freely assemblable electrical cable to be provided in a connection housing and the conductor of the cable to be electrically conductively connected to a contact needle of the contact housing. In this case, by means of the screw connection of the contact housing to the connection housing, a reliable and permanent effective connection is ensured which also makes possible secure contact-making for years or even decades.

It is particularly advantageous that the solar plug connection according to the invention provides an electrical plug connection of small design which is suitable for flexible use in the mounting of photovoltaic installations. Electrical connecting cables are typically provided on solar modules for photovoltaic installations, said cables having a latching plug fastener, for example, in order to connect one solar module to the next solar module. Such conventional plug connectors function satisfactorily. It becomes complicated, however, if on account of structural conditions owing to a chimney, a house projection or a dormer or the like, the distance between one solar module and the next solar module varies and in particular becomes greater than envisaged. The connecting cable of a solar module then has to be lengthened.

The fitters do not always carry a special tool for such activities with them. Moreover, on account of the working conditions often made more difficult on the roof slope of a house roof, it is not always possible for a person to carry all the required tools.

Particularly if such a solar cable has to be led through a frame profile of a window or through a narrow cable duct, this results in stringent requirements regarding the demand for space. Here the invention makes possible a solar plug connection of particularly small design in which the solar plug connection with the connection housing and the contact housing overall takes up only very little space. That is ensured, inter alia, by virtue of the contact needle being introduced into the conductor of the cable in a defined manner from the front. In particular, this means that the contact needle is introduced axially into the axially oriented conductor. The screwing-together in this case ensures a defined penetration of the contact needle into the conductor of the cable, such that a reliable, reproducible and permanent secure connection is made possible. The axial arrangement of the connecting cable, the contact needle and the associated housing parts makes it possible to provide a solar plug connection having a particularly small external diameter.

In this case, the design allows the electrical cable that is to be connected to be freely assembled and brought to the desired length for example by means of a diagonal cutter or the like. The entrance area for the contact needle that is provided at the front end of the cable to be connected is oriented, however, in particular approximately perpendicularly to the longitudinal extent of the cable and provides a defined area for the penetration of the contact needle. As a result of the simple construction, stripping the insulation from the solar cable is not required.

In contrast to so-called Pierce connections, in which the conductor to be connected regularly runs at an angle or perpendicularly to the connected conductor, the solar plug connection according to the invention requires considerably less space.

Moreover, as a result of the special connection geometry in which the contact needle is introduced into the conductor of the cable in a defined manner from the front and in which the contact needle dips axially into the axially oriented conductor, a particularly good electrical connection between the contact needle and the conductor of the cable to be connected is ensured, as a result of which the high current intensities and high voltages that occur in photovoltaic installations can be transmitted reliably and permanently. Overall, the axial penetration of the contact needle into the axially oriented conductor gives rise to a large contact area that can transmit considerable current intensities.

In order to ensure a reliable penetration of the contact needle into a conductor of the cable to be connected, the contact needle is equipped in particular with a tapering contact tip.

Preferably, the contact housing has a hollow-cylindrical receptacle region, by virtue of the contact needle being arranged centrally. The connection housing has in particular a hollow-cylindrical cable receptacle region, which is provided for receiving a cable having a centrally arranged conductor.

Within the meaning of this present application, the term "hollow-cylindrical" should be understood to mean that the receptacle region and the cable receptacle region in each case have substantially a cylindrical cavity. In particular, the receptacle region at the contact housing can have overall or in sections an e.g. conically extending taper in order to ensure, by means of the taper, particularly fixed clamping of the contact tip in the conductor of the cable to be connected.

In preferred configurations, the contact housing has an internal thread, which interacts with the external thread of the connection housing in order to produce the screw connection. The connection housing can be embodied substantially as a hollow screw, for example, which in the interior receives the cable to be connected, while an external thread for screwing together with the internal thread of the contact housing is provided radially on the outside.

Preferably, the contact needle has a tip tapering toward the end, wherein two or more radial diameter steps can also be provided on the contact needle, the contact tip tapering to a greater extent at said steps.

Particularly preferably, the ratio of thread pitch per revolution to the external diameter of the contact housing is less than 1:3. In particular, the ratio is less than 1:5.

Such a ratio of the thread pitch to the external diameter of the contact housing defines a relatively fine thread, which results in a high transmission ratio of the penetration force relative to the rotational force to be expended when screwing together the screw connection. In particular, the expended force for rotating the screw use in is transmitted in a manner increased at least by the factor 5, and in particular by the factor 8, and particularly preferably by the factor 10, as penetration force of the contact needle into the conductor of the cable to be connected. This ensures that a reliable and permanent secure penetration of the contact needle into the conductor of the cable to be connected can be ensured with a relatively low rotational force that can be applied manually.

In all configurations it is preferred for an anti-withdrawal securing means to be provided on the connection housing and to secure a cable that has been pushed into the connection housing from the rear end if from the front end pressure is exerted on a cable introduced therein. The anti-withdrawal securing means ensures that once a cable has been introduced into the connection housing, said cable cannot be pushed out of the connection housing again by pressure from the front on the introduced cable. In particular, the anti-withdrawal securing means also ensures that the cable with the conductor is held in a defined manner in the connection housing. Lateral warping of the cable is also prevented, in particular, by the anti-withdrawal securing means. The anti-withdrawal securing means also encompasses the wall which surrounds the cable and which prevents lateral yielding.

Preferably, the anti-withdrawal securing means comprises a spring device having a plurality of spring tongues. In this case, the rear end of the spring tongue arranged closer to the rear end of the connection housing are situated radially further outward than the front ends of the spring tongues arranged further forward.

Those ends of the spring tongues which are situated further at the rear are supported in particular toward the rear on the connection housing or a shoulder in the connection housing or the like.

The spring tongues are provided, in particular, for being placed at a shallow or acute angle on the conductor insulation of a cable to be connected. The front tips of the spring tongues can easily penetrate into the cable insulation and become caught there, such that in the case of a pressure on the front conductor end received at the connection housing, a reinforcement of the retaining force of the spring tongues occurs since the rear ends of the spring tongues are supported on the connection housing. A self-reinforcing system is thus realized in which a correspondingly high securing force is applied independently of the compressive force from the front or else the tensile force on the cable from the rear.

The anti-withdrawal securing means preferably adjoins a sealing device. Particularly preferably, a movement of the spring tongue of the anti-withdrawal securing means is delimited by a conical stop surface on the sealing device. As a result, the retaining force that is possible as a result of the anti-withdrawal securing means is increased still further. Moreover, the sealing device contributes to permanently reliable operation.

In all configurations, latching means can be provided on the contact housing and the connection housing, said latching means serving for latching that contact housing and the connection housing to one another after connection has been made.

In particular, the latching means can impede or even prevent renewed opening. Prevention of an opening process contributes to safety when mounting photovoltaic installations, then undesired opening of a solar plug connection and the high DC voltages present there and the high currents flowing are not safe for persons.

Preferably, the threads on the contact housing and the connection housing have at least four and in particular between five and ten complete thread turns. As a result of this number of thread turns, firstly a fixed and permanent connection of the contact housing to the connection housing is ensured, while secondly the force to be expended in this case is relatively low. Moreover, the mounting effort is kept within limits, since the number of required revolutions is chosen not to be excessively high.

In all configurations, preferably a cable is received at the connection housing, and the connection housing is connectable or connected to the contact housing.

Preferably, an external diameter of the contact housing and/or of the connection housing is less than four times the external diameter of the cable. Preferably, the external diameter of the contact housing and/or of the connection housing is in a range of between approximately 1.2 times and 3 times the external diameter of the cable. The term "external diameter" is understood here to mean an external diameter in a plane where the cable is situated within the housing. It is also possible for the term to be understood to mean a maximum external diameter of the contact housing and/or of the connection housing.

The maximum external diameter of the contact needle is, in particular, greater than 10% of the external diameter of the conductor and, in particular, the maximum external diameter of the contact needle is in a range of between approximately 20% and 50% of the external diameter of the conductor.

In all embodiments, the conductor of the cable consists in particular of a plurality of in particular flexible cores. As a result of a contact tip dipping into a bundle of parallel cores of a conductor, the cores present are forced radially outward, as a result of which the contact pressure increases.

In all configurations it is preferred for the conductor to be surrounded at least by an insulating layer. In this case, an external diameter of the cable is at least double the magnitude of an external diameter of the conductor. In particular, the radical thickness of the insulating layer can correspond approximately to the diameter of the conductor, deviations of, for example, 20% upward and downward being possible.

In particular a solar plug connection in which the external diameter of the contact housing and/or of the connection housing is less than 3 times the external diameter of the cable makes possible a solar plug connection of particularly small design which, if appropriate, can also be accommodated within the profiles of windows or frames or in small or very small cable ducts.

Further advantages and features of the invention are explained below in the exemplary embodiment explained with reference to the accompanying FIGS. 1 to 6.

DETAILED DESCRIPTION OF THE PREFERRED EMBODIMENT(S)

Figure 1:
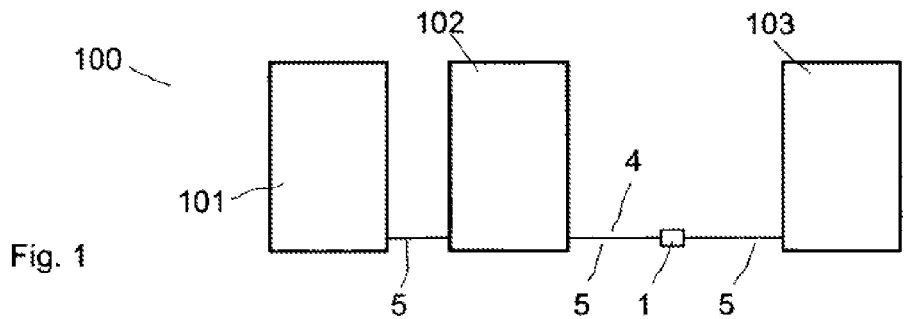
FIG. 1 shows a schematic illustration of a photovoltaic installation.

FIG. 1 depicts a highly schematic view of a photovoltaic installation 100, which here in the simple example has three solar modules 101, 102 and 103 equipped with photovoltaic cells which are not illustrated in detail. The individual solar modules 101 to 103 of the photovoltaic installation 100 are connected to one another via cables 4 embodied as solar cables, in order to produce the required electrical connection. The solar cables 5 carry away the electrical power generated, but control signals can additionally also be applied to them.

At light wells, roof surfaces, windows or other structural changes and conditions, the normal distance between a solar module 101 and a solar module 102 changes and has to be bridged by means of a lengthening of the connecting cable 5. Since such photovoltaic installations are often carried out on obliquely arranged roof surfaces and not every tool is always to hand there during mounting, simple mounting without a particular special tool is advantageous. Moreover, it is advantageous if the solar plug connection 1 is of small design, in order also to be able to be led through profiles, cable ducts or other small interspaces.

In this case, it is possible that the solar plug connection 1 can be connected to a freely assemblable cable 4 on one side or else to a freely assemblable cable 4 on both sides. In the case of a possibility for connection on two sides, a symmetrical construction, in particular, is advantageous.

Figure 2:
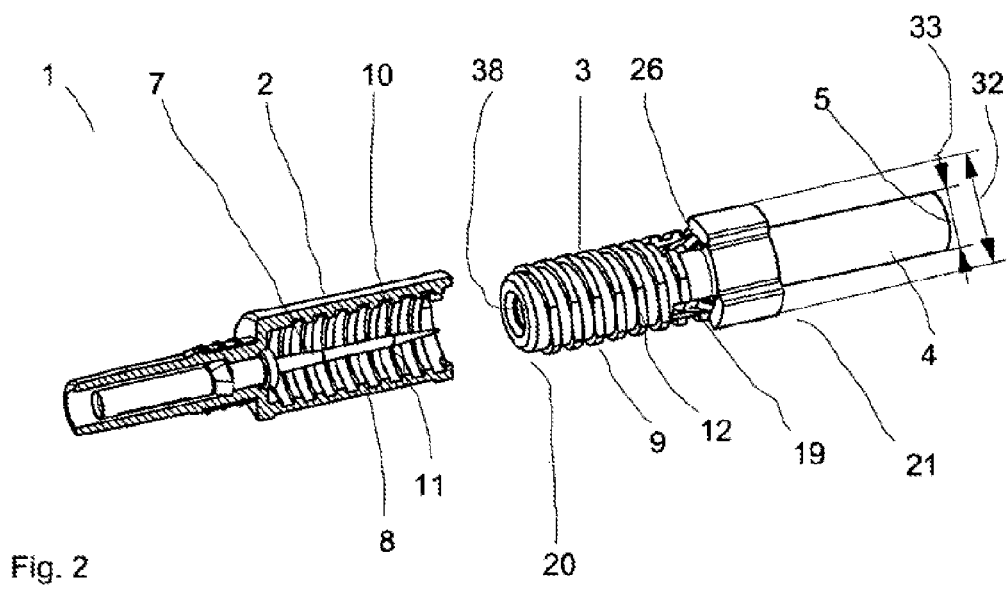
FIG. 2 shows a solar plug connection for the photovoltaic installation from FIG. 1.

FIG. 2 shows the solar plug connection 1 in a perspective exploded illustration, wherein the contact housing 2 is illustrated in a semitransparent manner in order to make it possible to view the interior. The contact housing 2 has a contact needle 7 in the interior, said contact needle here being embodied as a contact tip 10 and being provided for dipping into an entrance area 38 at the connection housing 3 when the connection housing 3 is connected to the contact housing 2.

In the connection housing 3, a solar cable 5 as cable 4 is introduced from the rear end into the cable receptacle region 12, which is embodied in a hollow-cylindrical fashion, until the solar cable 5 and in particular the conductor 6 contained therein is visible at the entrance area 38 at the front end 20 of the connection housing and bears there. An anti-withdrawal securing means 19 secures the solar cable 5 against being unintentionally pushed back. At the same time, the anti-withdrawal securing means 19 also constitutes a tensile stress relief if tension is applied to the rear end of the solar cable 5.

It can clearly be seen in FIG. 2 that the solar plug connection 1 is embodied overall with a very small design, since the external diameter 33 of the solar cable 5 here is only approximately half the magnitude of the maximum external diameter 32 of the solar plug connection 1. Overall, the connection housing 3, which is embodied for instance as a hollow screw, has an external thread 14 as thread 9, which, for the purpose of electrical connection, is screwed into the thread 8, embodied as an internal thread 13, in the contact housing 2. In this case, the contact tip 10 of the contact needle 7 enters into the entrance area 38 at the connection housing 3 and is received centrally by the conductor 6 of the solar cable 5 provided there.

Figure 3:
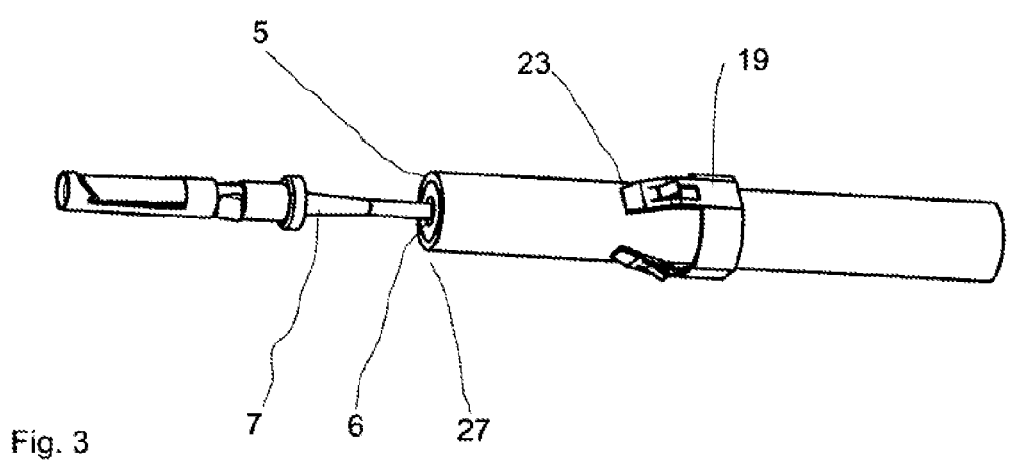
FIG. 3 shows a schematic illustration of a contact needle that dips into the conductor of a cable to be connected.

FIG. 3 shows an illustration of the contact tip 10 of the contact needle 7 and of the solar cable 5 to be connected, the connection housing 3 and the contact housing 2 having been omitted. The conductor 6 and the conductor insulation 27 that surrounded the conductor can clearly be discerned. The contact tip 7 has dipped into the conductor 6. The anti-withdrawal securing means 19 is furthermore depicted on the solar cable 5, said anti-withdrawal securing means here being embodied as a spring device 21 and having spring tongues 23. The front ends 25 of the spring tongues 23 are supported on the conductor insulation 27 of the solar cable 5, while the rear ends 24 of the spring tongues 23 are provided for being supported on shoulders 26 in the connection housing 3.

The front ends 25 of the spring zones 23 can easily penetrate into the conductor insulation 27 in order to obtain a positively locking connection, such that the solar cable 5 can no longer be pushed out of the connection housing 3 axially without using force.

Figure 4:
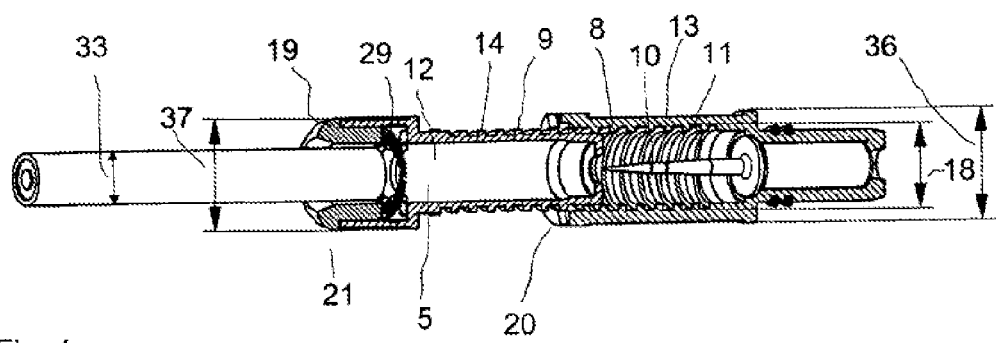
FIG. 4 shows the beginning of screwing together a connection housing with a contact housing in section.

FIG. 4 shows the beginning of the mounting process a solar plug connection 1 when the connection housing 3 with the external thread 14 is introduced into the contact housing 2. Afterward, the contact housing 2 is screwed together with the connection housing 3, wherein the external thread 14 of the connection housing 3 engages into the internal thread 13 of the contact housing 2.

Seven to eight thread rings are available here for the screwing together, such that the connection housing 3 and/or the contact housing 3 can be rotated with relatively slight rotational force and in particular manually in order to introduce the contact needle 7 with the contact tip 10 into the conductor 6 of the solar cable 5.

The external diameter 18 of the contact housing 2 here is approximately of the same magnitude as the external diameter 37 of the connection housing 3, such that both external diameters correspond approximately to the maximum external diameter 32 of the solar plug connector 1. The external diameter 32 here is approximately double the magnitude of the external diameter 33 of the solar cable 5.

Owing to the fact that the thread pitch is relatively small and is approximately only one quarter of the external diameter of the external thread 14 per thread turn, a high force transmission is obtained, such that a high axial penetration force of the contact needle 7 is obtained with a relatively low rotational force.

Figure 5:
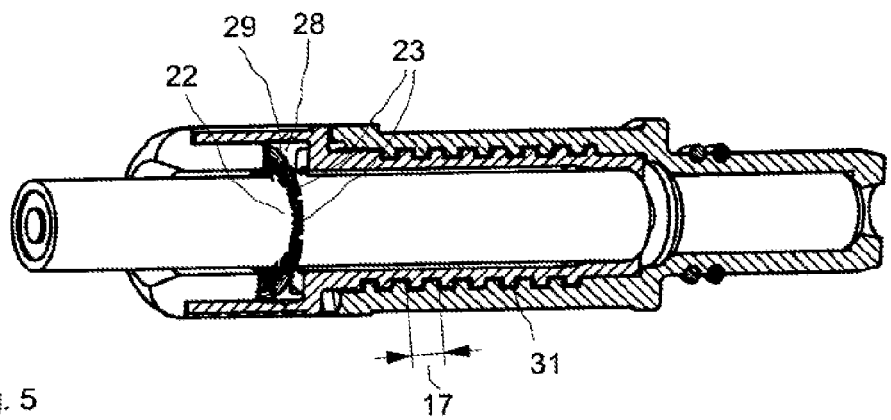
FIG. 5 shows the finished solar plug connector from FIG. 4 in section.

FIG. 5 shows the finished state, in which the contact needle 7 has penetrated as far as possible into the conductor 6 of the solar cable 5. A very large contact area between the conductor 6 and the contact needle 7 is made possible as a result.

For sealing purposes, a sealing device 28 can be provided, which can have a conical stop surface 29, against which the spring device 22 or the anti-withdrawal securing means 19 can bear in order to delimit the nestling of the spring limbs 23 of the contact spring 22.

Figure 6:
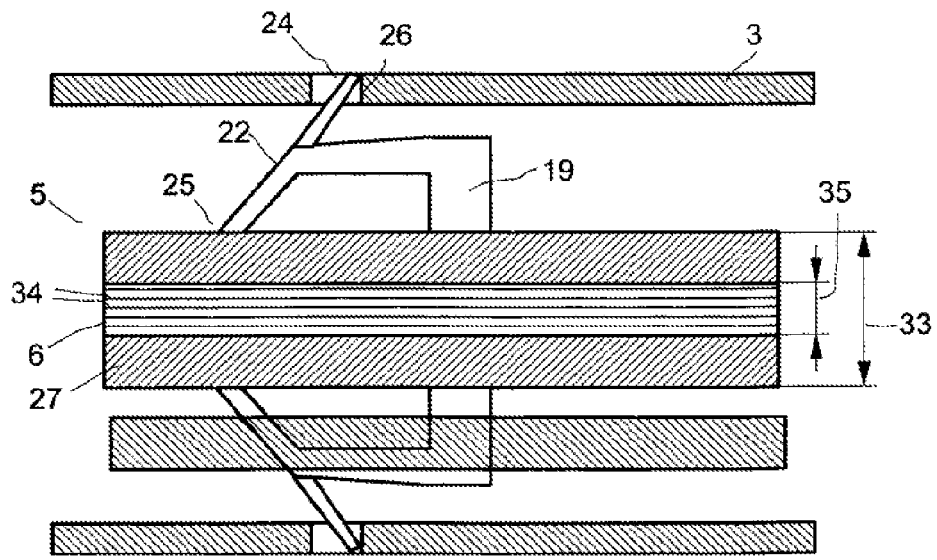
FIG. 6 shows a schematic illustration of a different anti-withdrawal securing means for a solar plug connection.

FIG. 6 shows an anti-withdrawal securing means 19 in which the front ends 25 of the spring zones 23 bear against the conductor insulation 27 of the solar cable 5, while the rear end 24 are supported on a shoulder 26 of the connection housing 3. In this case, the rear ends 25 of the spring zones 23 can extend outward through a window in the connection housing 3.

It can likewise be seen in FIG. 6 that the radial thickness of the insulation layer 27 in the exemplary embodiment is approximately just as thick as the diameter 35 of the conductor 6, such that the thickness of the insulation is between approximately 25% and 50% of the total external diameter 33 of the solar cable 5.

Overall, the invention provides a solar plug connection 1 of small design which can be used to lengthen solar cables 5 without a tool, and in particular without a special tool. The solar plug connection can be used not just as a connection of solar modules, but can generally be used as an electrical connection device for transmitting power. A simple diagonal cutter suffices to prepare the length of a required solar cable 5. The end of the solar cable 5 is pushed into the connection housing 3 from the rear until the conductor 6 bears against the front entrance area 38. By means of the anti-withdrawal securing means 19 provided in the connection housing 3, the solar cable 5 is accommodated securely at the connection housing 3, even when the contact needle 7 enters into the entrance area 38 from the front and thus exerts considerable axial pressure on the solar cable 5.

On the contact needle 7, a gel or adhesive can also be added in order to protect the connection even more securely against ingress of water or the like.

LIST OF REFERENCE SIGNS

Solar plug connection 1
Contact housing 2
Connection housing 3
Cable 4
Solar cable 5
Conductor 6
Contact needle 7
Thread 8
Thread 9
Contact tip 10
Receptacle region 11
Cable receptacle region 12
Internal thread 13
External thread 14
Diameter step 15, 16
Thread pitch 17
External diameter, contact housing 18
Anti-withdrawal securing means 19
Front end 20
Rear end 21
Spring device 22
Spring tongue 23
Rear end 24
Front end 25
Shoulder 26
Conductor insulation 27
Sealing device 28
Conical stop surface 29
Latching means 30
Thread turn 31
External diameter of the solar plug connector 32
External diameter of the cable 33
Core 34
External diameter of the conductor 35
External diameter of the thread 36
External diameter of the connection housing 37
Entrance area 38
Photovoltaic installation 100
Solar module 101-103

The invention claimed is:

1. A solar plug connection for photovoltaic installations comprising at least one contact housing and at least one connection housing, wherein the connection housing is connectable to the contact housing and serves for receiving at least one freely assemblable cable, wherein a contact needle for making contact with the conductor of a cable to be connected is arranged on the contact housing, and in that a thread is arranged on the contact housing, said thread being provided for interacting with a thread provided on the connection housing, in order to introduce the contact needle into the conductor of the cable from a front in a defined manner when screwing together the contact housing and the connection housing;

wherein an anti-withdrawal securing means comprises a spring device having a plurality of spring tongues, wherein the rear ends of the spring tongues arranged closer to the rear end of the connection housing are situated radially further outward than the front ends of the spring tongues arranged further forward, and wherein the rear ends of the spring tongues are supported on the connection housing toward the rear.

2. The solar plug connection as claimed in claim 1, wherein the contact housing has a hollow-cylindrical receptacle region, in which the contact needle is arranged centrally, and/or wherein the connection housing has a hollow-cylindrical cable receptacle region, which is provided for receiving a cable having a centrally arranged conductor.

3. The solar plug connection as claimed in claim 1, wherein the contact housing has an internal thread, which interacts with an external thread of the connection housing.

4. The solar plug connection as claimed in claim 1, wherein the contact needle has a tip tapering toward the end.

5. The solar plug connection as claimed in claim 1, wherein the ratio of thread pitch per revolution to external diameter of the contact housing is less than 1:3 and in particular less than 1:5.

6. The solar plug connection as claimed in claim 1, wherein the anti-withdrawal securing means is a substantially elastic anti-withdrawal securing means that is provided on the connection housing and secures a cable that has been pushed into the connection housing from the rear end if from the front end pressure is exerted on a cable introduced therein.

7. The solar plug connection as claimed in claim 1, wherein the conductor of the cable consists of a plurality of flexible cores.

8. The solar plug connection as claimed in claim 1, wherein the anti-withdrawal securing means adjoins a sealing device, and wherein the spring tongues of the anti-withdrawal securing means are delimited by a conical stop surface on the sealing device.

9. The solar plug connection as claimed in claim 1, wherein the conductor is surrounded by an insulating layer, and wherein an external diameter of the cable is at least double the magnitude of an external diameter of the conductor.

10. The solar plug connection as claimed in claim 1, wherein the threads on the contact housing and the connection housing comprise at least four complete thread turns.

11. The solar plug connection as claimed in claim 1, wherein a cable is received at the connection housing, and wherein the connection housing is connected to the contact housing.

12. The solar plug connection as claimed in claim 1, wherein an external diameter of the contact housing and/or of the connection housing is less than four times the external diameter of the cable.

\* \* \* \* \*